(12) United States Patent
Lin et al.

(10) Patent No.: US 11,125,952 B2
(45) Date of Patent: Sep. 21, 2021

(54) CABLE ARRANGEMENT DEVICE

(71) Applicants: Gloriole Electroptic Technology Corp., Kaohsiung (TW); Amphenol Fiber Optic Technology (Shenzhen) Co., Ltd., Shenzhen (CN)

(72) Inventors: Jim Lin, Kaohsiung (TW); Shu-Hui Hsu, Kaohsiung (TW); Wen-Chi Kuo, Kaohsiung (TW)

(73) Assignees: GLORIOLE ELECTROPTIC TECHNOLOGY CORP., Kaohsiung (TW); AMPHENOL FIBER OPTIC TECHNOLOGY, Shenzhen (CN); (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/896,516

(22) Filed: Jun. 9, 2020

(65) Prior Publication Data
US 2020/0400898 A1 Dec. 24, 2020

(30) Foreign Application Priority Data
Jun. 21, 2019 (TW) .................................. 108207940

(51) Int. Cl.
*G02B 6/38* (2006.01)

(52) U.S. Cl.
CPC .................................. *G02B 6/3887* (2013.01)

(58) Field of Classification Search
CPC .. G02B 6/4439; G02B 6/4471; G02B 6/4472; G02B 6/3873; G02B 6/3807; G02B 6/3887
USPC .............................................. 385/53–78, 139
See application file for complete search history.

(56) References Cited

U.S. PATENT DOCUMENTS

2019/0204524 A1* 7/2019 Petersen .............. G02B 6/4471

* cited by examiner

*Primary Examiner* — Michael P Mooney
(74) *Attorney, Agent, or Firm* — Muncy, Geissler, Olds & Lowe, P.C.

(57) ABSTRACT

A cable arrangement device adapted to use with an optical fiber cable includes two detachably connected positioning halves defining an axial groove unit that permits the optical fiber cable to extend therethrough, and two auxiliary grooves that are diametrically opposite to each other with respect to the main groove, and two sleeves disposed detachably between the positioning halves. When the sleeves are mounted between the positioning halves, the device is suitable for a three-core fiber. When the sleeves are detached from the positioning halves, the device is suitable for a single-core fiber.

7 Claims, 12 Drawing Sheets

CABLE ARRANGEMENT DEVICE

CROSS-REFERENCE TO RELATED APPLICATION

This application claims priority to Taiwanese Patent Application No. 108207940, filed on Jun. 21, 2019.

FIELD

The disclosure relates to a cable arrangement device, more particularly to a cable arrangement device adapted to use with an optical fiber cable.

BACKGROUND

Referring to FIGS. 1 and 2, an optical fiber cable 11 to be connected to an optical fiber connector 1 is shown. The optical fiber connector 1 includes a conventional cable arrangement device 13 including two positioning halves 131. The positioning halves 131 cooperate with each other to define a groove 130 permitting the optical fiber 11 to extend therethrough.

However, the conventional cable arrangement device 13 is dedicated to use with a single-core optical fiber cable 11. It is required to design another cable arrangement device for arranging a three-core optical fiber cable.

SUMMARY

Therefore, an object of the disclosure is to provide a cable arrangement device that can be used with a single-core optical fiber cable or a three-core optical fiber cable.

According to one aspect of the disclosure, a cable arrangement device adapted to use with at least one optical fiber cable is provided. The cable arrangement device includes two main positioning halves and two sleeves. The main positioning halves are detachably connected to each other and cooperate with each other to define an axial groove unit, and define two auxiliary grooves. The main groove unit extends in an axial direction and is adapted to permit the optical fiber cable to extend therethrough. The auxiliary grooves are diametrically opposite to each other with respect to the axial groove unit. Each of the main positioning halves includes a receiving wall portion, a main wall portion, a connecting wall portion, and an end wall portion. The main wall portion is connected to the receiving wall portion. The connecting wall portion extends from the main wall portion in a direction away from the receiving wall portion. The end wall portion extends from the connecting wall portion in a direction away from the main wall portion. The receiving wall portions of the main positioning halves cooperate with each other to define a cable-receiving groove extending in the axial direction. The main wall portions of the main positioning halves cooperate with each other to define a main groove extending in the axial direction. The connecting wall portions of the main positioning halves cooperate with each other to define a sleeve-receiving groove extending in the axial direction. The end wall portions of the main positioning halves cooperate with each other to define a main extending groove and to define two auxiliary extending grooves. The main extending groove cooperates with the cable-receiving groove, the main groove and the sleeve-receiving groove to constitute the axial groove unit. The auxiliary extending grooves are diametrically opposite to each other with respect to the main extending groove and are disposed respectively registered with the auxiliary grooves. The sleeves are detachably mounted in the sleeve-receiving groove and respectively define two through holes. Each of the through holes is in spatial communication and is registered with a respective one of the auxiliary extending grooves and the corresponding one of the auxiliary grooves in the axial direction.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
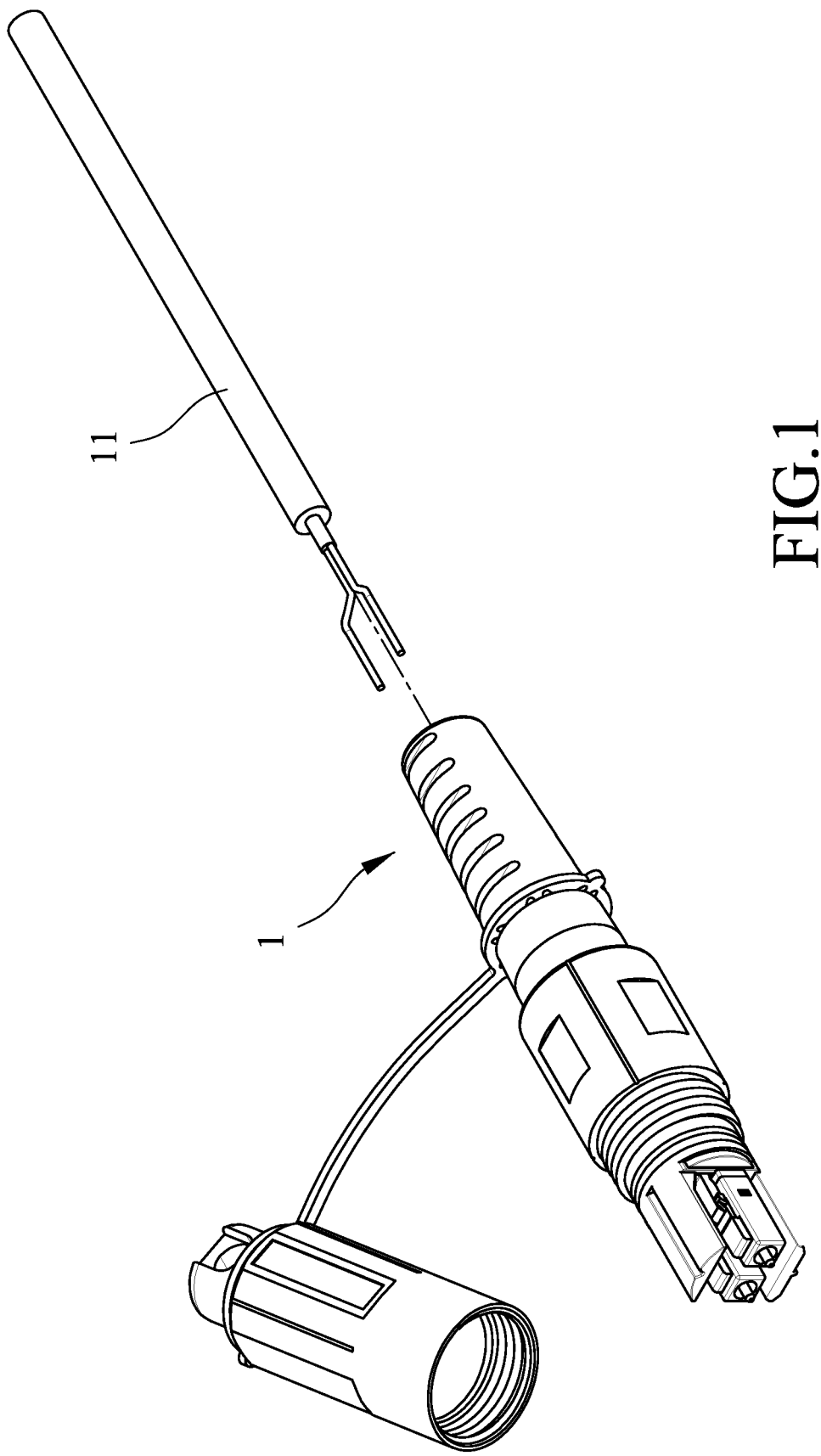
FIG. 1 is a perspective view of an optical fiber cable to be connected to an optical fiber connector.
Figure 2:
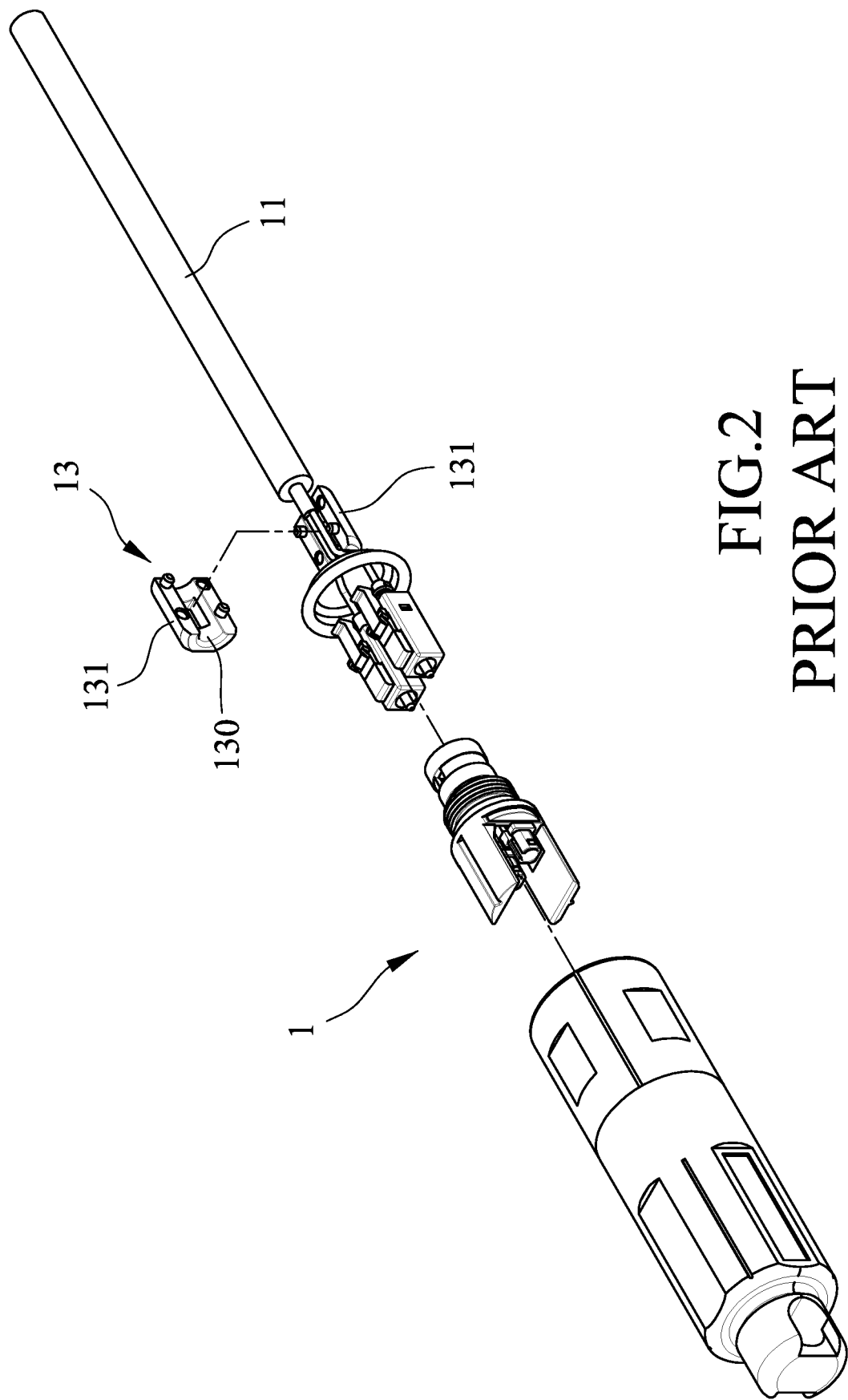
FIG. 2 is a partly exploded perspective view of a conventional cable arrangement device of the optical fiber connector shown in FIG. 1.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
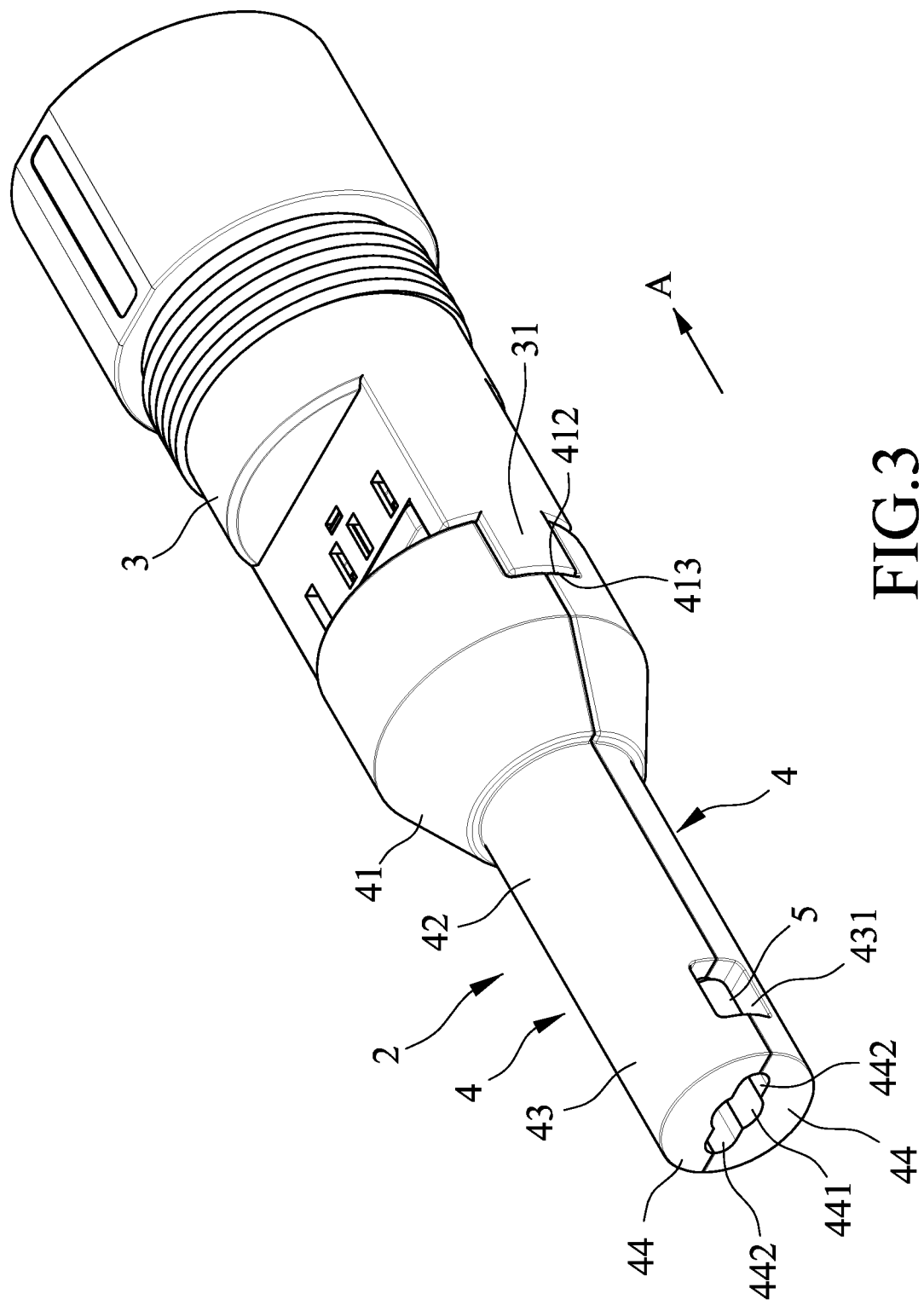
FIG. 3 is an assembled perspective view of a cable arrangement device according to a first embodiment of the present disclosure to be used with an optical fiber cable.
Figure 4:
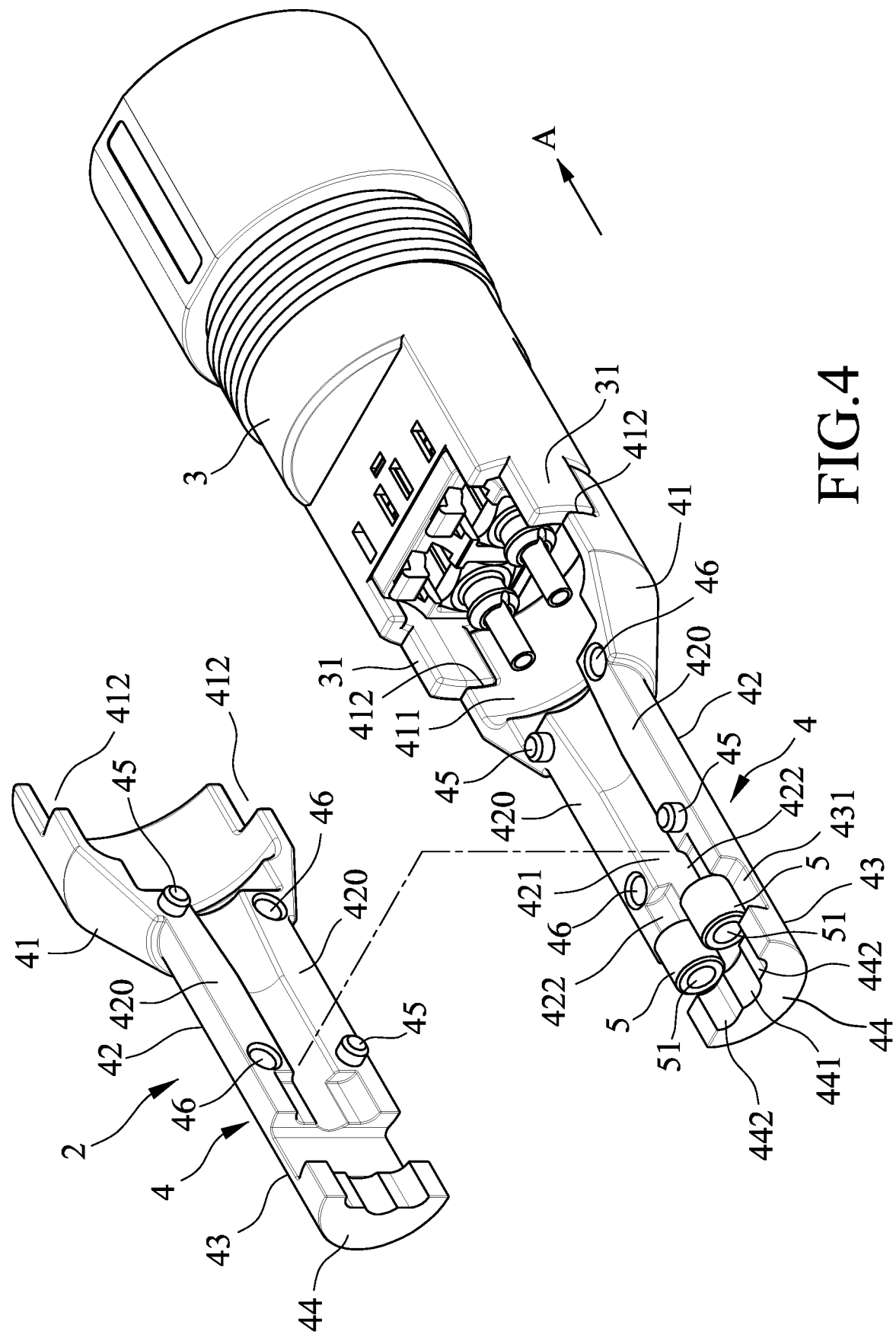
FIG. 4 is a partly exploded perspective view of the first embodiment.
Figure 5:
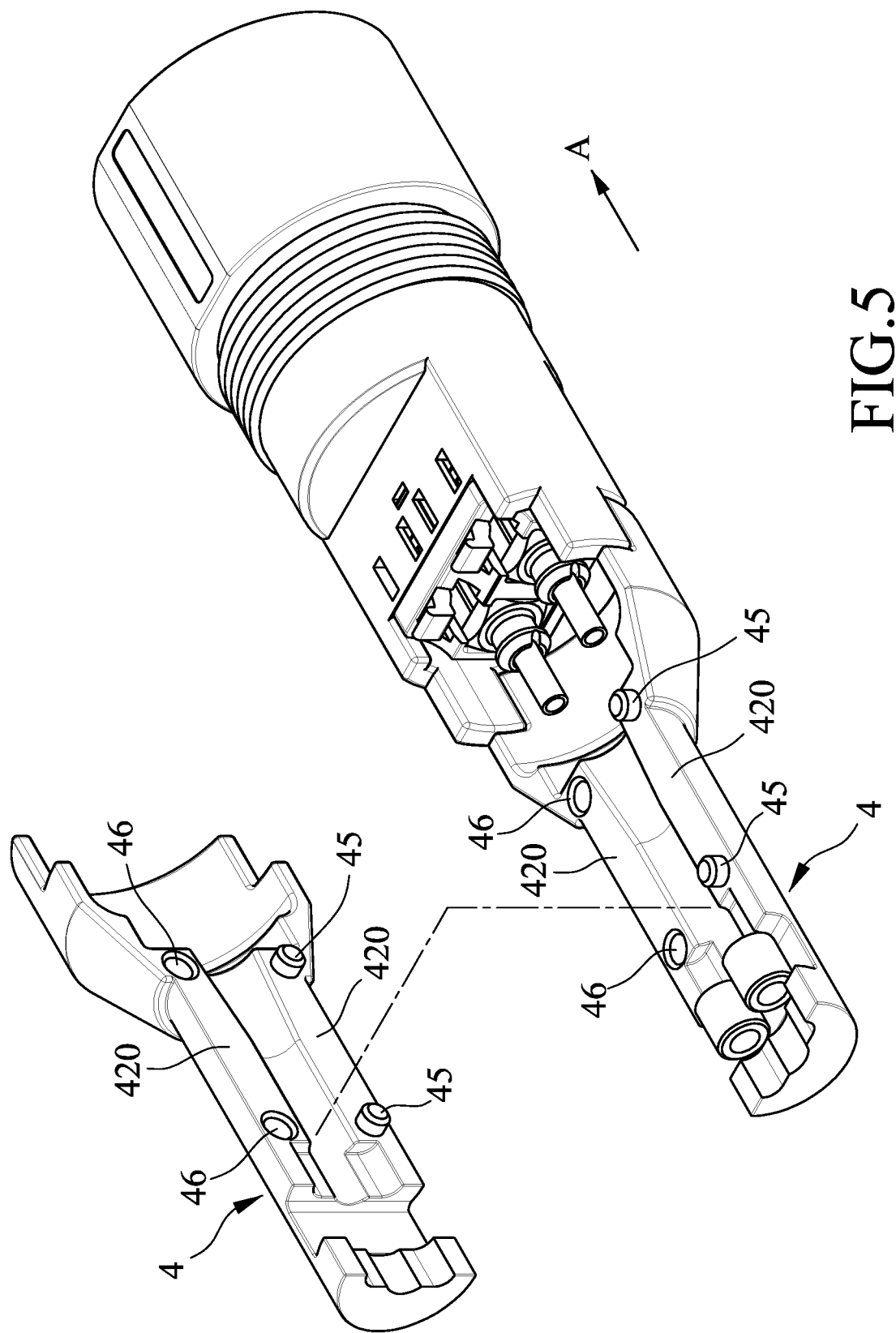
FIG. 5 is a modification of the first embodiment.

Referring to FIGS. 3 to 5, a cable arrangement device 2 according to a first embodiment of the present disclosure is shown. The cable arrangement device 2 is adapted to be connected to a receptacle seat 3, is adapted to use with a three-core optical fiber cable 61 (see FIG. 6) or a single-core optical fiber cable 62 (see FIG. 7), and includes two main positioning halves 4 detachably connected to each other, and two sleeves 5 disposed between the main positioning halves 4.

Each of the main positioning halves 4 includes a receiving wall portion 41, a main wall portion 42, a connecting wall portion 43, an end wall portion 44, a plurality of first engaging portions 45, and a plurality of second engaging portions 46.

For each of the main positioning halves 4, the receiving wall portion 41 extends in an axial direction (A), the main wall portion 42 is connected to the receiving wall portion 41, the connecting wall portion 43 extends from the main wall portion 42 in a direction away from the receiving wall portion 41, and the end wall portion 44 extends from the connecting wall portion 43 in a direction away from the main wall portion 41.

Each of the main positioning halves 4 includes two adjoining surfaces 420 diametrically opposite to each other. The adjoining surfaces 420 of one of the positioning halves 4 abut respectively against those of the other one of the positioning halves 4. The first and second engaging portions 45, 46 are formed at the adjoining surfaces 420. The first engaging portions 45 of one of the main positioning halves 4 detachably and respectively engage the second engaging portions 46 of the other one of the main positioning halves 4, so that the main positioning halves 4 are interconnected. Each of the first engaging portion 45 is one of a tongue and a groove and each of the second engaging portions 46 is the other one of the tongue and the groove. In this embodiment, two first engaging portions 45 are tongues diagonally formed on the adjoining surfaces 420 of the main positioning halves 4 and two second engaging portions 46 are grooves diagonally formed in the adjoining surfaces 420 of the main positioning halves 4. In other words, each adjoining surface 420 of each main positioning half 4 is formed with a tongue and a groove.

As shown in FIG. 5, in a modification, for each positioning half 4, one of the adjoining surfaces 420 is formed with two first engaging portions 45, and the other one of the adjoining surfaces 420 is formed with two second engaging portions 46.

The receiving wall portions 41 of the main positioning halves 4 cooperate with each other to define a cable-receiving groove 411 extending in the axial direction (A) and adapted for receiving a portion of the receptacle seat 3. Specifically, the receiving wall portion 41 of each of the main positioning halves 41 is formed with two positioning slots 412 disposed at an end opposite to the end wall portion 44 in the axial direction (A) and in spatial communication with the cable-receiving groove 411. The positioning slots 412 of the main positioning halves 41 cooperate with each other to define two engaging notches 413. The engaging notches 413 are diametrically opposite to each other and are adapted to engage respectively two end protrusions 31 of the receptacle seat 3 so as to position the cable arrangement device 2 relative to the receptacle seat 3. Note that in other embodiments, the main positioning halves 4 may be modified to have different structures to be positioned relative to the receptacle seat 3.

The main wall portions 42 of the main positioning halves 4 cooperate with each other to define a main groove 421 and two auxiliary grooves 422. The main groove 421 extends in the axial direction (A), is in spatial communication with the cable-receiving groove 411, and is adapted to permit an optical fiber cable to extend therethrough. The auxiliary grooves 422 are diametrically opposite to each other with respect to the main groove 421.

The connecting wall portions 43 of the main positioning halves 4 cooperate with each other to define a sleeve-receiving groove 431 extending in the axial direction (A) and in spatial communication with the main groove 421 and the auxiliary grooves 422. The end wall portions 44 of the main positioning halves 4 cooperate with each other to define a main extending groove 441 and to define two auxiliary extending grooves 442. The main extending groove 441 is in spatial communication with the sleeve-receiving groove 431 and the main groove 421. The auxiliary extending grooves 442 are diametrically opposite to each other with respect to the main extending groove 441 and are disposed respectively registered with the auxiliary grooves 422.

The sleeves 5 are detachably mounted in the sleeve-receiving groove 431 and respectively define two through holes 51. Each of the through holes 51 is in spatial communication and is registered with a respective one of the auxiliary extending grooves 442 and the corresponding one of the auxiliary grooves 422 in the axial direction (A).

Figure 6:
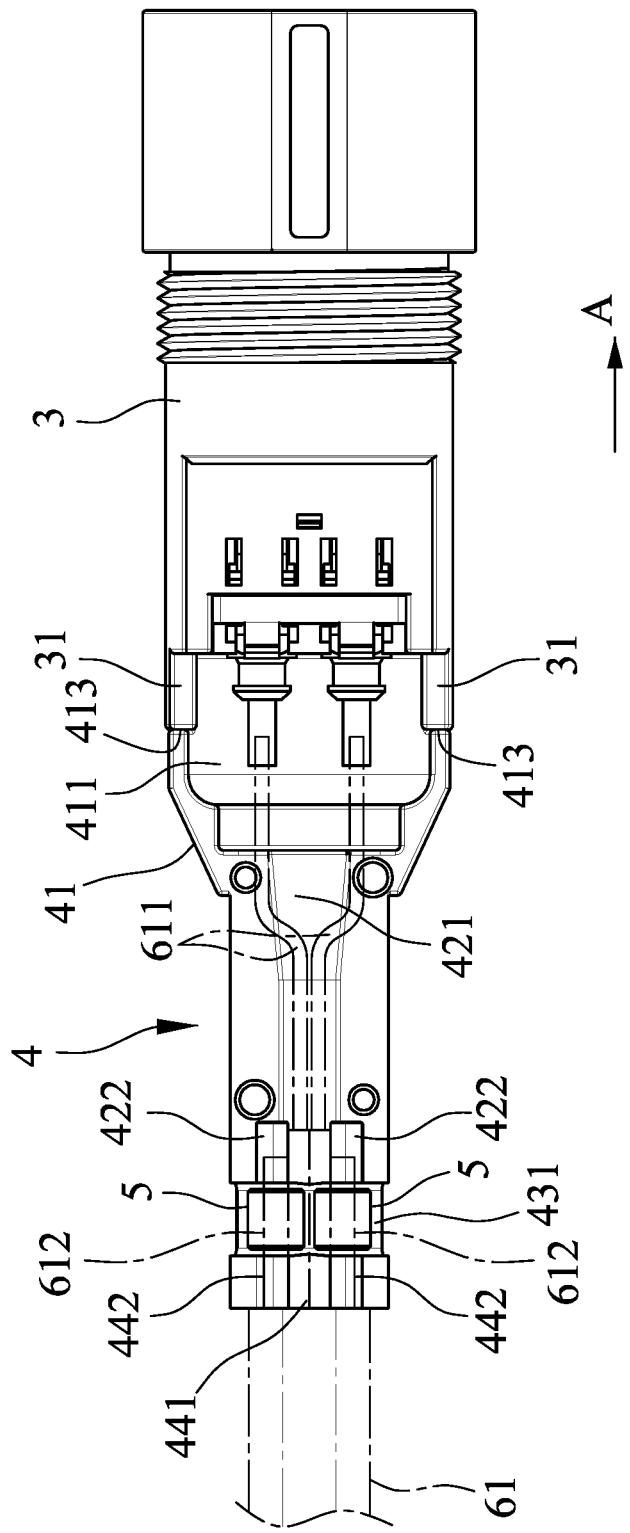
FIG. 6 is a schematic top view of the first embodiment, illustrating the cable arrangement device adapted to use with a three-core optical fiber cable.

FIG. 6 illustrates that the cable arrangement device of the first embodiment is used with a three-core optical fiber cable 61, which includes two main strands 611 and two lateral strands 612 and which extends from the receptacle seat 3 and through the main positioning halves 4. Specifically, the main strands 611 extend sequentially through the cable-receiving groove 411, the main groove 421, the sleeve-receiving groove 431, and the main extending groove 442. The lateral strands 612 extend respectively through through holes 51 of the sleeves 5 and respectively through the auxiliary grooves 422.

Figure 7:
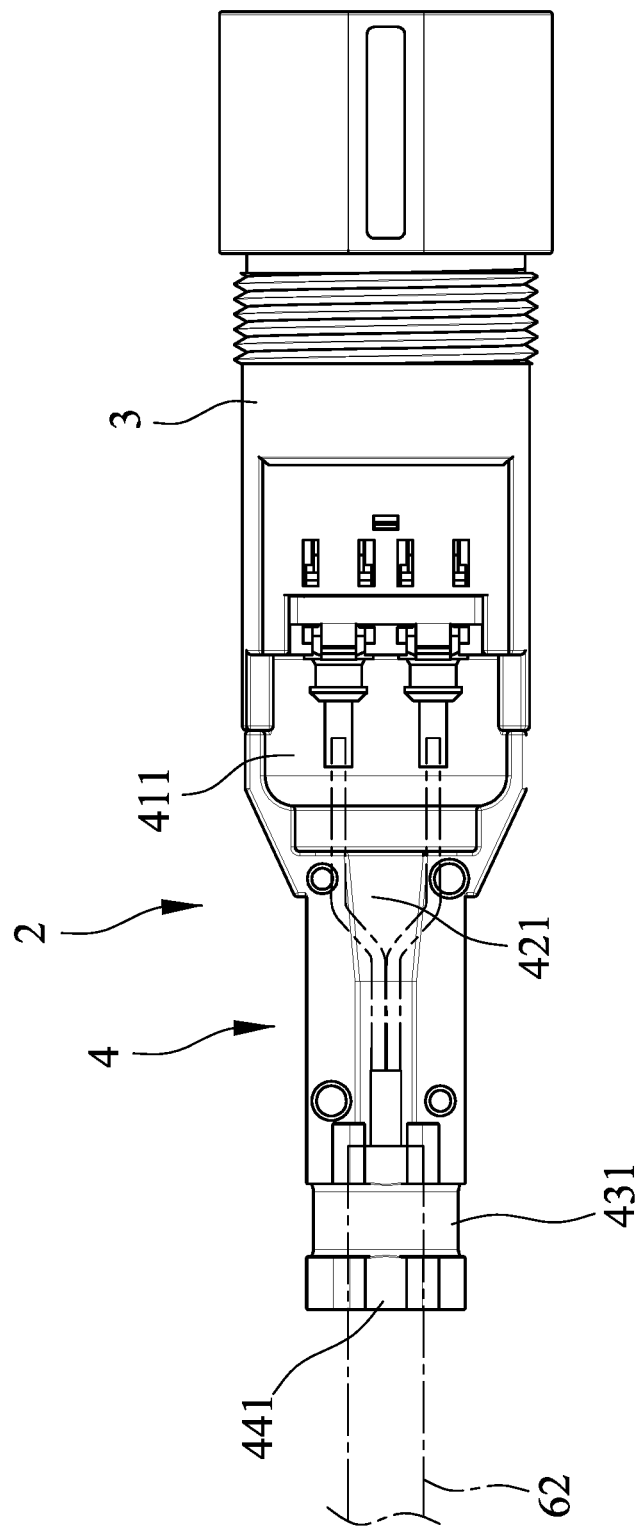
FIG. 7 is a schematic top view of the first embodiment, illustrating the cable arrangement device adapted to use with a single-core optical fiber cable.

Now referring to FIG. 7, when the cable arrangement device 2 of the present disclosure is used with a single-core optical fiber cable 62, the sleeves 5 are detached from the sleeve-receiving groove 431. In this case, the optical fiber cable 62 extends from the receptacle seat 3 and extends sequentially through the cable-receiving groove 411, the main groove 421, the sleeve-receiving groove 431, and the main extending groove 441. Accordingly, the cable arrangement device 2 of the present disclosure can be used with a three-core optical fiber cable or a single-core optical fiber cable.

Figure 8:
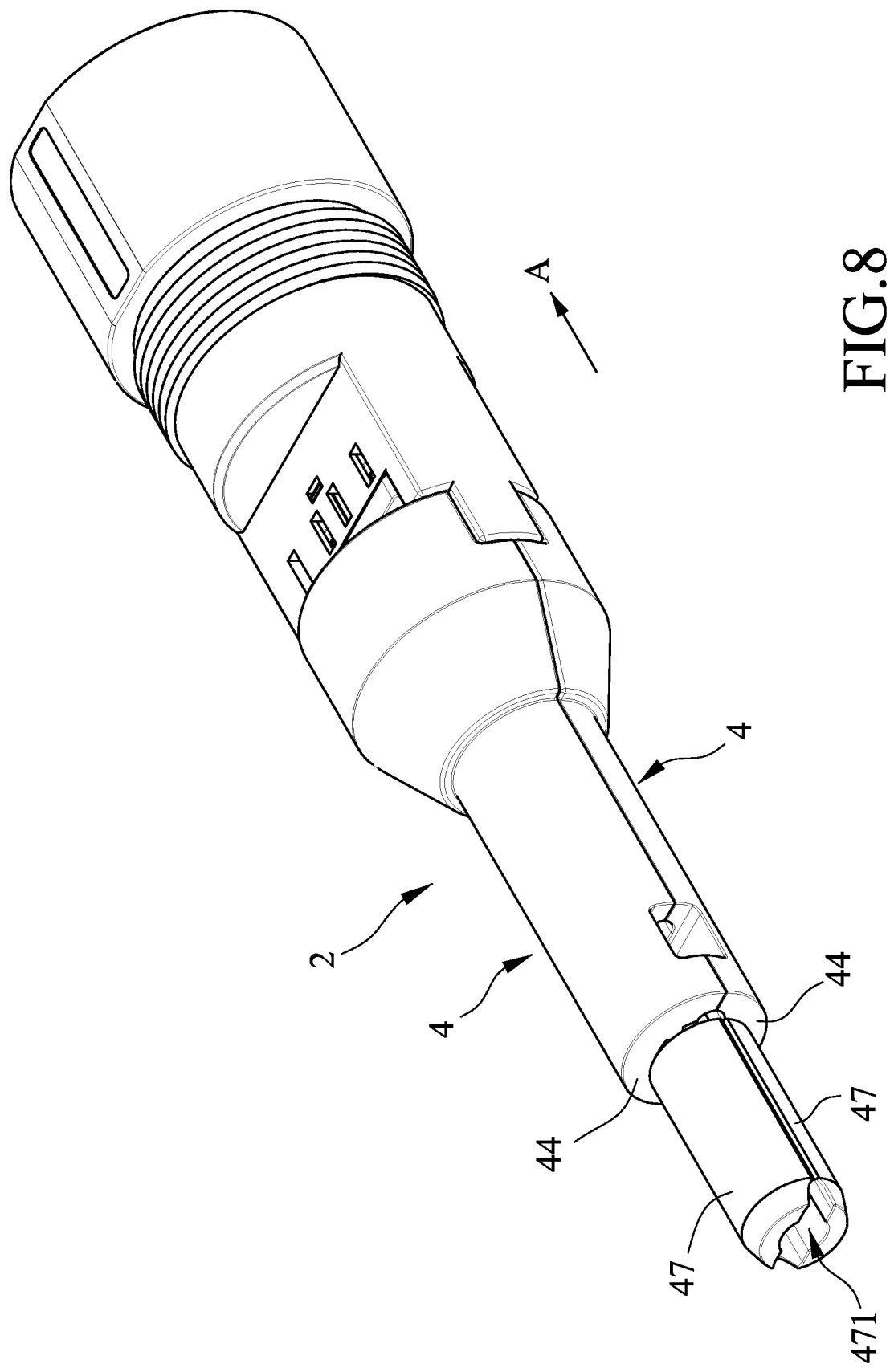
FIG. 8 is an assembled perspective view of a cable arrangement device according to a second embodiment of the present disclosure.
Figure 9:
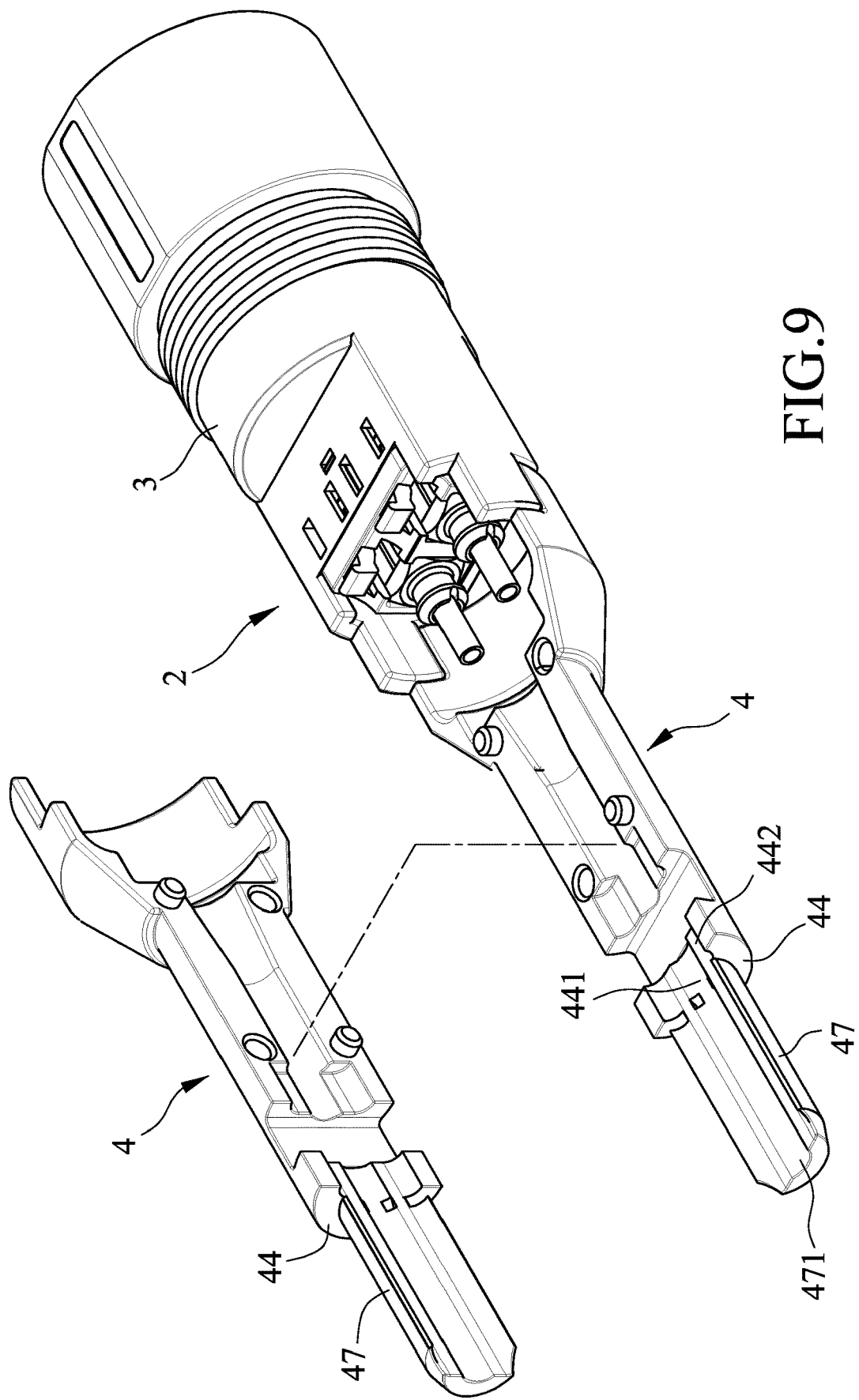
FIG. 9 is a partly exploded perspective view of the second embodiment.
Figure 10:
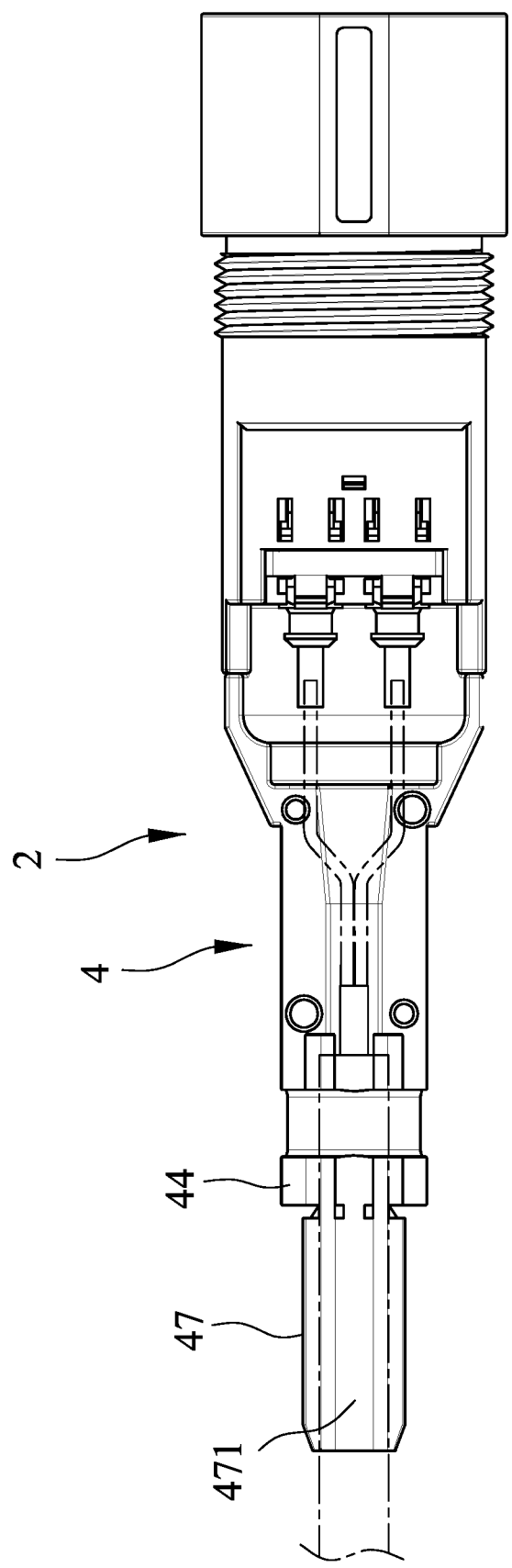
FIG. 10 is a schematic top view of the second embodiment, illustrating the cable arrangement device adapted to use with a single-core optical fiber cable.

Referring to FIGS. 8 to 10, a cable arrangement device 2 according to a second embodiment of the present disclosure is shown. The second embodiment is similar to the first embodiment and the differences therebetween reside in the following. In the second embodiment, each of the main positioning halves 4 further includes an extension wall portion 47 extending from the end wall portion 44 away from the receiving wall portion 41 in the axial direction (A). The extension wall portions 47 of the main positioning halves 4 cooperate with each other to define an outlet groove 471 that is in spatial communication with the main extending groove 441 and that is adapted to permit an optical fiber cable to extend therethrough. The cable arrangement device 2 of the second embodiment can be used with an optical fiber cable 61 connected to the receptacle seat 3 by a lucent connector (LC) connector (not shown).

Figure 11:
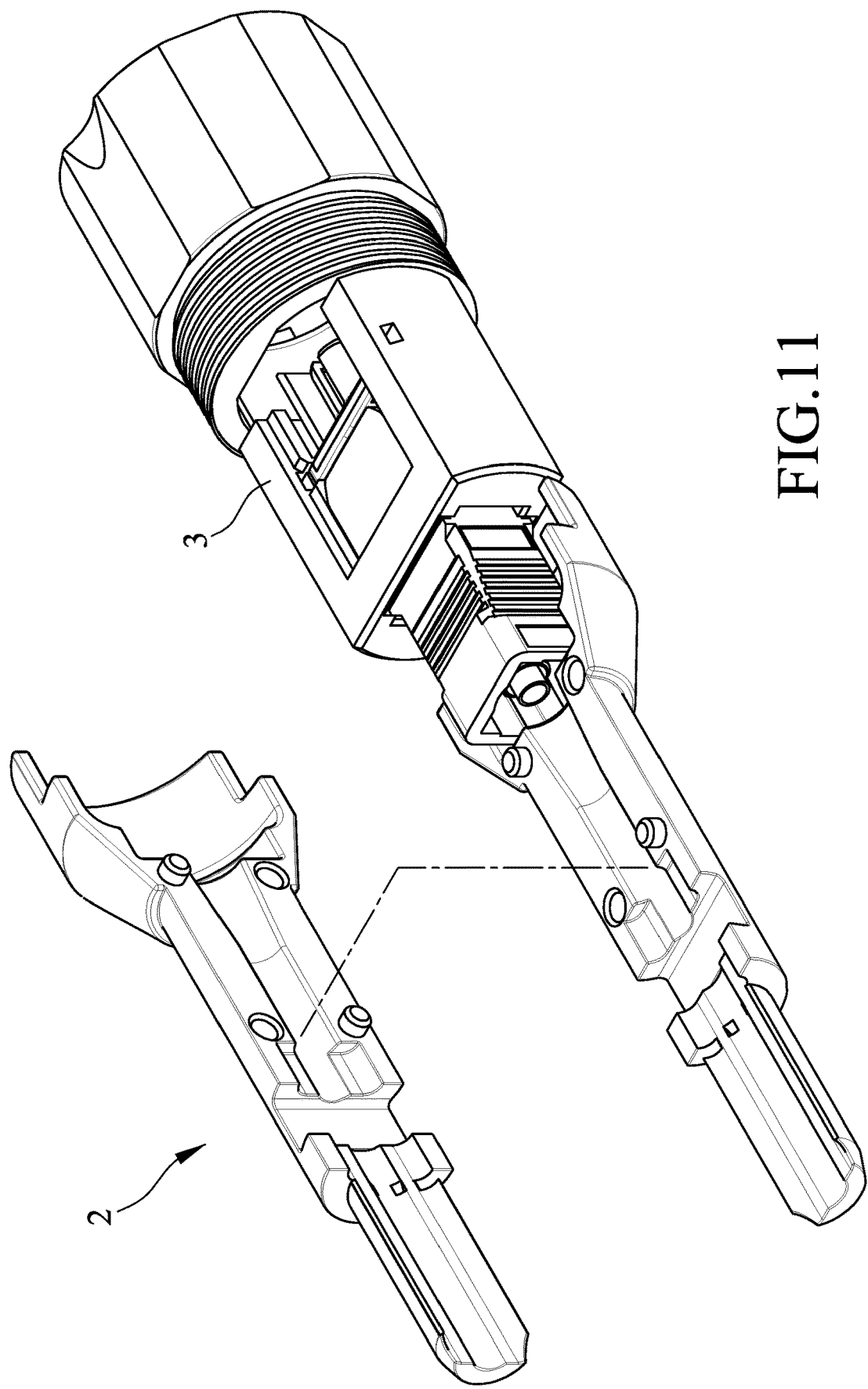
FIG. 11 is a partly exploded perspective view of the second embodiment used with a subscriber connector (SC)
Figure 12:
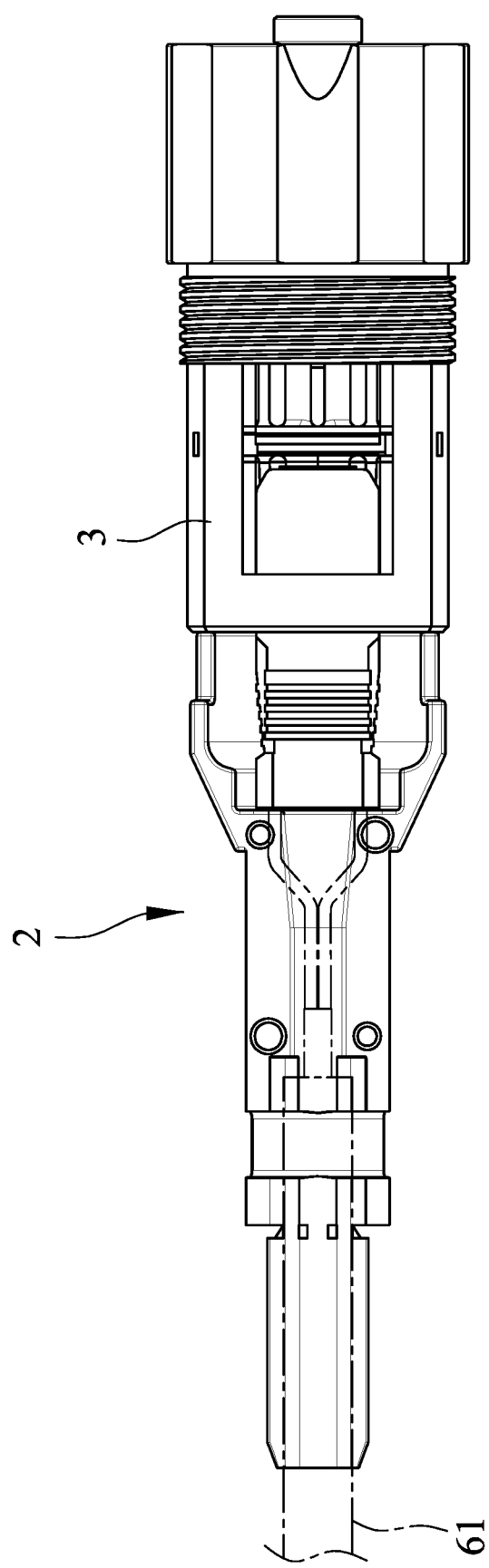
FIG. 12 is a schematic top view of FIG. 11, illustrating the cable arrangement device of the second embodiment used with a single-core optical fiber cable.

FIGS. 11 and 12 illustrate that the cable arrangement device 2 of the second embodiment adapted to use with the single-core optical fiber cable 61 connected to the receptacle seat 3 by a subscriber connector (SC).

To sum up, by virtue of the structures of the main positioning halves 4 that defines the sleeve-receiving groove 431 which is mounted with the sleeves 5, the cable arrangement device 2 can be provided to arrange a single-core optical fiber cable or a three-core optical fiber cable. Further, the cable arrangement device 2 of the present disclosure is suitable to be used with different types of connectors, e.g., LC connector or SC connector connected to the optical fiber cable and thus is versatile to be used in optical fiber cable connection.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A cable arrangement device adapted to use with at least one optical fiber cable and comprising:

two main positioning halves detachably connected to each other and cooperating with each other to define an axial groove unit that extends in an axial direction and that is adapted to permit the optical fiber cable to extend therethrough, and two auxiliary grooves that are diametrically opposite to each other with respect to said axial groove unit, each of said main positioning halves including a receiving wall portion, a main wall portion connected to said receiving wall portion, a connecting wall portion extending from said main wall portion in a direction away from said receiving wall portion, and an end wall portion extending from said connecting wall portion in a direction away from said main wall portion, said receiving wall portions of said main positioning halves cooperating with each other to define a cable-receiving groove extending in the axial direction, said main wall portions of said main positioning halves cooperating with each other to define a main groove extending in the axial direction, said connecting wall portions of said main positioning halves cooperating with each other to define a sleeve-receiving groove extending in the axial direction, said end wall portions of said main positioning halves cooperating with each other to define a main extending groove that extends in the axial direction, and to define two auxiliary extending grooves that are diametrically opposite to each other with respect to said main extending groove and that are disposed respectively registered with said auxiliary grooves, said main extending groove cooperating with said cable-receiving groove, said main groove and said sleeve-receiving groove to constitute said axial groove unit; and two sleeves detachably mounted in said sleeve-receiving groove and respectively defining two through holes each of which is in spatial communication and registered with a respective one of said auxiliary extending grooves and the corresponding one of said auxiliary grooves in the axial direction.

2. The cable arrangement device as claimed in claim 1, wherein each of said main positioning halves includes two adjoining surfaces diametrically opposite to each other, said adjoining surfaces of one of said positioning halves abutting respectively against those of the other one of said positioning halves, each of said main positioning halves further including a plurality of first engaging portions formed at said adjoining surfaces and a plurality of second engaging portions formed at said adjoining surfaces, said first engaging portions of one of said main positioning halves detachably and respectively engaging said second engaging portions of the other one of said main positioning halves, so that said main positioning halves are interconnected.

3. The cable arrangement device as claimed in claim 2, wherein each of said first engaging portion is one of a tongue and a groove and each of said second engaging portions is the other one of the tongue and the groove.

4. The cable arrangement device as claimed in claim 1, wherein said main wall portion of each of said main positioning halves has two adjoining surfaces diametrically opposite to each other, said adjoining surfaces of one of said positioning halves abutting respectively against those of the other one of said positioning halves, each of said main positioning halves further including at least one first engaging portion formed at one of said adjoining surfaces and at least one second engaging portion formed at the other one of said adjoining surfaces, said first engaging portion of one of said main positioning halves detachably engaging said second engaging portion of the other one of said main positioning halves, so that said main positioning halves are interconnected.

5. The cable arrangement device as claimed in claim 4, wherein said first engaging portion is one of a tongue and a groove and said second engaging portion is the other one of the tongue and the groove.

6. The cable arrangement device as claimed in claim 1, said cable arrangement device being adapted to be connected to a receptacle seat having two protrusions at an end, wherein said receiving wall portion of each of said main positioning halves is formed with two positioning slots disposed at an end opposite to said end wall portion in the axial direction and in spatial communication with said cable-receiving groove, said positioning slots of said main positioning halves cooperating with each other to define two engaging notches that are diametrically opposite with each other and that are adapted to engage respectively the protrusions of the receptacle seat so as to position said cable arrangement device relative to the receptacle seat.

7. The cable arrangement device as claimed in claim 1, wherein each of said main positioning halves further includes an extension wall portion extending from said end wall portion away from said receiving wall portion in the axial direction, said extension wall portions of said main positioning halves cooperating with each other to define an outlet groove that is in spatial communication with said main extending groove and that is adapted to to permit the optical fiber cable to extend therethrough.

* * * * *